United States Patent
Williams et al.

(10) Patent No.: US 9,157,617 B1
(45) Date of Patent: *Oct. 13, 2015

(54) MODULAR HANGING LASERS TO PROVIDE EASY INSTALLATION IN A DISTRIBUTION CENTER

(71) Applicants: Jeff Williams, El cerrito, CA (US); Ravi Bhaskaran, San Francisco, CA (US); Charlie Martin, Walnut Creek, CA (US)

(72) Inventors: Jeff Williams, El cerrito, CA (US); Ravi Bhaskaran, San Francisco, CA (US); Charlie Martin, Walnut Creek, CA (US)

(73) Assignee: CODESHELF, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/675,774

(22) Filed: Apr. 1, 2015

Related U.S. Application Data

(63) Continuation of application No. 14/520,353, filed on Oct. 22, 2014, now Pat. No. 9,057,508.

(51) Int. Cl.
*G02B 27/20* (2006.01)
*F21V 21/08* (2006.01)
(Continued)

(52) U.S. Cl.
CPC ............. *F21V 21/0832* (2013.01); *F21V 14/02* (2013.01); *G02B 5/32* (2013.01); *G06Q 10/087* (2013.01)

(58) Field of Classification Search
CPC ....... F21V 14/02; F21V 19/00; F21V 19/003; F21V 21/00; F21V 21/008; F21V 21/08; F21V 21/0832; F21W 2131/402; G02B 5/325; G06Q 10/087
USPC .................. 362/259, 391, 457–458; 235/385; 705/28–29
See application file for complete search history.

(56) References Cited

U.S. PATENT DOCUMENTS 4,093,086 A   6/1978   Lucas et al.
4,563,739 A   1/1986   Gerpheide et al.
(Continued)

FOREIGN PATENT DOCUMENTS

CA   2577346 A1   4/2006
CA   2652114 A1   12/2007
(Continued)

OTHER PUBLICATIONS

Peter Whitney et al. "A Low-Friction Passive Fluid Transmission and Fluid-Tendon Soft Actuator", IEEE/RSJ International Conference on Intelligent Robots and Systems (IROS) 2014, Sep. 14, 2014 (pp. 8) http://www.disneyresearch.com/wp-content/uploads/Project_FluidSoftActuator_IROS14_paper.pdf.

(Continued)

*Primary Examiner* — Jason Moon Han
(74) *Attorney, Agent, or Firm* — Raj Abhyanker, P.C.

(57) ABSTRACT

Disclosed are a system, device and/or an apparatus of modular hanging lasers to enable real-time control in a distribution center. In one embodiment, a laser assembly, includes a first support member having a curved upper hook, a second support member having the curved upper hook, and a printed circuit board in between the first support member and the second support member: (1) that is physically coupled with the first support member at a first rotation point of the printed circuit board, and which is physically coupled with the second support member at a second rotation point of the printed circuit board. The laser assembly is attached to a first wire of a distribution center above at least one row of the distribution center having at least one of a shelving, an inventory, and storage compartments along at least one row.

20 Claims, 8 Drawing Sheets

(51) Int. Cl.
  *G02B 5/32* (2006.01)
  *G06Q 10/08* (2012.01)
  *F21V 14/02* (2006.01)

(56) References Cited

U.S. PATENT DOCUMENTS

| | | | |
|---|---|---|---|
| 4,716,530 A | 12/1987 | Ogawa et al. |
| 4,737,910 A | 4/1988 | Kimbrow |
| 4,974,166 A | 11/1990 | Maney et al. |
| 5,050,153 A | 9/1991 | Lee |
| 5,117,096 A | 5/1992 | Bauer et al. |
| 5,166,884 A | 11/1992 | Maney et al. |
| 5,228,820 A | 7/1993 | Stansfield et al. |
| 5,311,335 A | 5/1994 | Crabtree |
| 5,328,260 A | 7/1994 | Beirise |
| 5,362,197 A | 11/1994 | Rigling |
| 5,394,766 A | 3/1995 | Johnson et al. |
| 5,434,775 A | 7/1995 | Sims et al. |
| 5,625,559 A | 4/1997 | Egawa |
| 5,646,389 A | 7/1997 | Bravman et al. |
| 5,664,113 A | 9/1997 | Worger et al. |
| 5,720,157 A | 2/1998 | Ross |
| 5,963,134 A | 10/1999 | Bowers et al. |
| 6,164,537 A | 12/2000 | Mariani et al. |
| 6,208,908 B1 | 3/2001 | Boyd et al. |
| 6,289,260 B1 | 9/2001 | Bradley et al. |
| 6,307,952 B1 | 10/2001 | Dietz |
| 6,339,764 B1 | 1/2002 | Livesay et al. |
| 6,341,271 B1 | 1/2002 | Salvo et al. |
| 6,567,788 B1 | 5/2003 | Johnson, Jr. |
| 6,602,037 B2 | 8/2003 | Winkler |
| 6,622,127 B1 | 9/2003 | Klots et al. |
| 6,681,990 B2 | 1/2004 | Vogler et al. |
| 6,748,292 B2 | 6/2004 | Mountz |
| 6,845,912 B2 | 1/2005 | Scannell |
| 6,895,301 B2 | 5/2005 | Mountz |
| 6,950,722 B2 | 9/2005 | Mountz |
| 7,009,501 B2 | 3/2006 | Olch |
| 7,238,079 B2 | 7/2007 | Madhani et al. |
| 7,267,271 B2 | 9/2007 | Rhea |
| 7,342,494 B2 | 3/2008 | Maloney |
| 7,402,018 B2 | 7/2008 | Mountz et al. |
| 7,418,405 B1 | 8/2008 | Utter et al. |
| 7,504,949 B1 | 3/2009 | Rouaix et al. |
| 7,516,848 B1 | 4/2009 | Shakes et al. |
| 7,591,630 B2 | 9/2009 | Lert, Jr. |
| 7,628,093 B2 | 12/2009 | Madhani et al. |
| 7,650,298 B2 | 1/2010 | Godlewski |
| 7,698,176 B2 | 4/2010 | Taylor et al. |
| 7,706,920 B2 | 4/2010 | Wieland |
| 7,718,105 B2 | 5/2010 | Tye et al. |
| 7,740,953 B2 | 6/2010 | Jackson et al. |
| 7,751,928 B1 | 7/2010 | Antony et al. |
| 7,774,243 B1 | 8/2010 | Antony et al. |
| 7,819,719 B2 | 10/2010 | Tye et al. |
| 7,826,919 B2 | 11/2010 | D'Andrea et al. |
| 7,850,413 B2 | 12/2010 | Fontana |
| 7,873,469 B2 | 1/2011 | D'Andrea et al. |
| 7,887,729 B2 | 2/2011 | Tye et al. |
| 7,894,932 B2 | 2/2011 | Mountz et al. |
| 7,894,933 B2 | 2/2011 | Mountz et al. |
| 7,912,574 B2 | 3/2011 | Wurman et al. |
| 7,920,962 B2 | 4/2011 | D'Andrea et al. |
| 7,984,500 B1 | 7/2011 | Khanna et al. |
| 8,006,903 B2 | 8/2011 | Braun et al. |
| 8,032,417 B2 | 10/2011 | Marella et al. |
| 8,042,171 B1 | 10/2011 | Nordstrom et al. |
| 8,052,185 B2 | 11/2011 | Madhani |
| 8,060,255 B2 | 11/2011 | Wieland |
| 8,068,978 B2 | 11/2011 | D'Andrea et al. |
| 8,170,711 B2 | 5/2012 | D'Andrea et al. |
| 8,209,748 B1 | 6/2012 | Nordstrom et al. |
| 8,220,710 B2 | 7/2012 | Hoffman et al. |
| 8,239,291 B2 | 8/2012 | Hoffman et al. |
| 8,244,469 B2 | 8/2012 | Cheung et al. |
| 8,244,603 B1 | 8/2012 | Tang et al. |
| 8,249,245 B2 | 8/2012 | Jay et al. |
| 8,265,873 B2 | 9/2012 | D'Andrea et al. |
| 8,269,447 B2 | 9/2012 | Smoot et al. |
| 8,280,546 B2 | 10/2012 | D'Andrea et al. |
| 8,280,547 B2 | 10/2012 | D'Andrea et al. |
| 8,301,294 B1 | 10/2012 | Shakes et al. |
| 8,306,650 B1 | 11/2012 | Antony et al. |
| 8,307,073 B1 | 11/2012 | Brundage et al. |
| 8,307,099 B1 | 11/2012 | Khanna et al. |
| 8,310,923 B1 | 11/2012 | Nordstrom et al. |
| 8,311,902 B2 | 11/2012 | Mountz et al. |
| 8,335,585 B2 | 12/2012 | Hansl et al. |
| 8,336,420 B2 | 12/2012 | Carter et al. |
| 8,351,689 B2 | 1/2013 | Turner et al. |
| 8,374,724 B2 | 2/2013 | Wieland et al. |
| 8,412,400 B2 | 4/2013 | D'Andrea et al. |
| 8,425,173 B2 | 4/2013 | Lert et al. |
| 8,429,806 B2 | 4/2013 | Tye et al. |
| 8,433,437 B1 | 4/2013 | Shakes et al. |
| 8,438,149 B1 | 5/2013 | Dicker et al. |
| 8,444,369 B2 | 5/2013 | Watt et al. |
| 8,458,227 B1 | 6/2013 | Brundage et al. |
| 8,473,374 B2 | 6/2013 | Allison et al. |
| 8,483,869 B2 | 7/2013 | Wurman et al. |
| 8,502,862 B2 | 8/2013 | Turner |
| 8,538,692 B2 | 9/2013 | Wurman et al. |
| 8,542,816 B2 | 9/2013 | Kaufman et al. |
| 8,548,613 B2 | 10/2013 | Presetenback et al. |
| 8,565,909 B2 | 10/2013 | Bickel et al. |
| 8,568,642 B2 | 10/2013 | Jackson et al. |
| 8,576,235 B1 | 11/2013 | Sumner et al. |
| 8,594,834 B1 | 11/2013 | Clark et al. |
| 8,600,035 B2 | 12/2013 | Jay et al. |
| 8,606,392 B2 | 12/2013 | Wurman et al. |
| 8,612,641 B1 | 12/2013 | Bozarth et al. |
| 8,626,335 B2 | 1/2014 | Wurman et al. |
| 8,626,935 B1 | 1/2014 | Khanna et al. |
| 8,639,382 B1 | 1/2014 | Clark et al. |
| 8,649,899 B2 | 2/2014 | Wurman et al. |
| 8,651,916 B2 | 2/2014 | Irmler et al. |
| 8,655,730 B1 | 2/2014 | Swan et al. |
| 8,688,598 B1 | 4/2014 | Shakes et al. |
| 8,700,499 B2 | 4/2014 | Laughlin et al. |
| 8,700,502 B2 | 4/2014 | Mountz et al. |
| 8,718,814 B1 | 5/2014 | Clark et al. |
| 8,723,872 B2 | 5/2014 | Beardsley et al. |
| 8,725,286 B2 | 5/2014 | D'Andrea et al. |
| 8,731,708 B2 | 5/2014 | Shakes et al. |
| 8,740,538 B2 | 6/2014 | Lert et al. |
| 8,744,627 B2 | 6/2014 | Wieland |
| 8,761,927 B2 | 6/2014 | Johnson et al. |
| 8,763,116 B1 | 6/2014 | Khanna et al. |
| 8,781,624 B2 | 7/2014 | Hodgins et al. |
| 8,786,680 B2 | 7/2014 | Shiratori et al. |
| 8,798,784 B1 | 8/2014 | Clark et al. |
| 8,798,786 B2 | 8/2014 | Wurman et al. |
| 8,801,488 B2 | 8/2014 | Irmler |
| 8,803,951 B2 | 8/2014 | Gay et al. |
| 8,805,573 B2 | 8/2014 | Brunner et al. |
| 8,805,574 B2 | 8/2014 | Stevens et al. |
| 8,805,584 B2 | 8/2014 | Yamane |
| 8,812,378 B2 | 8/2014 | Swafford, Jr. et al. |
| 8,821,781 B2 | 9/2014 | Martin |
| 8,823,639 B2 | 9/2014 | Jackson et al. |
| 8,831,984 B2 | 9/2014 | Hoffman et al. |
| 8,848,898 B2 | 9/2014 | Jay et al. |
| 8,858,351 B2 | 10/2014 | Crawford |
| 8,874,262 B2 | 10/2014 | Mistry |
| 8,874,444 B2 | 10/2014 | Irmler et al. |
| 8,876,571 B2 | 11/2014 | Trowbridge et al. |
| 8,879,717 B2 | 11/2014 | Jay et al. |
| 8,884,948 B2 | 11/2014 | Turner et al. |
| 8,886,710 B2 | 11/2014 | Evans et al. |
| 8,892,240 B1 | 11/2014 | Vliet et al. |
| 8,898,137 B1 | 11/2014 | Brundage et al. |
| 8,909,368 B2 | 12/2014 | D'Andrea et al. |
| 8,917,202 B2 | 12/2014 | Grosinger et al. |
| 8,918,202 B2 | 12/2014 | Kawano |

(56) References Cited

U.S. PATENT DOCUMENTS

| | | |
|---|---|---|
| 8,918,645 B2 | 12/2014 | Evans et al. |
| 8,927,081 B2 | 1/2015 | Tye et al. |
| 8,930,133 B2 | 1/2015 | Wurman et al. |
| 8,939,840 B2 | 1/2015 | Heatherly et al. |
| 8,947,422 B2 | 2/2015 | Turner et al. |
| 2002/0021954 A1 | 2/2002 | Winkler |
| 2003/0036985 A1 | 2/2003 | Soderholm |
| 2003/0216969 A1 | 11/2003 | Bauer et al. |
| 2003/0222141 A1 | 12/2003 | Vogler et al. |
| 2004/0010337 A1 | 1/2004 | Mountz |
| 2004/0010339 A1 | 1/2004 | Mountz |
| 2004/0034581 A1 | 2/2004 | Hill et al. |
| 2004/0093116 A1 | 5/2004 | Mountz |
| 2004/0111911 A1 | 6/2004 | Scannell |
| 2004/0188523 A1 | 9/2004 | Lunak et al. |
| 2005/0027620 A1 | 2/2005 | Taylor et al. |
| 2005/0087602 A1 | 4/2005 | Scannell |
| 2005/0102203 A1 | 5/2005 | Keong |
| 2005/0234784 A1 | 10/2005 | McClellan et al. |
| 2005/0238467 A1 | 10/2005 | Minges |
| 2006/0085235 A1 | 4/2006 | Nguyen et al. |
| 2006/0210382 A1 | 9/2006 | Mountz et al. |
| 2007/0017984 A1 | 1/2007 | Mountz et al. |
| 2007/0021031 A1 | 1/2007 | Madhani et al. |
| 2007/0021863 A1 | 1/2007 | Mountz et al. |
| 2007/0021864 A1 | 1/2007 | Mountz et al. |
| 2007/0136152 A1 | 6/2007 | Dunsker et al. |
| 2007/0162360 A1 | 7/2007 | Congram et al. |
| 2007/0288123 A1 | 12/2007 | D'Andrea et al. |
| 2007/0290040 A1 | 12/2007 | Wurman et al. |
| 2007/0293978 A1 | 12/2007 | Wurman et al. |
| 2007/0294029 A1 | 12/2007 | D'Andrea et al. |
| 2008/0001372 A1 | 1/2008 | Hoffman et al. |
| 2008/0051984 A1 | 2/2008 | Wurman et al. |
| 2008/0051985 A1 | 2/2008 | D'Andrea et al. |
| 2008/0166217 A1 | 7/2008 | Fontana |
| 2008/0167884 A1 | 7/2008 | Mountz et al. |
| 2008/0167933 A1 | 7/2008 | Hoffman et al. |
| 2008/0216596 A1 | 9/2008 | Madhani et al. |
| 2009/0074545 A1 | 3/2009 | Lert, Jr. et al. |
| 2009/0185884 A1 | 7/2009 | Wurman et al. |
| 2009/0202854 A1 | 8/2009 | Jackson et al. |
| 2009/0298603 A1 | 12/2009 | Crawford |
| 2009/0299521 A1 | 12/2009 | Hansl et al. |
| 2010/0174550 A1 | 7/2010 | Reverendo et al. |
| 2010/0227527 A1 | 9/2010 | Smoot et al. |
| 2010/0250001 A1 | 9/2010 | Hodgins et al. |
| 2010/0253919 A1 | 10/2010 | Douglas |
| 2010/0259057 A1 | 10/2010 | Madhani |
| 2010/0271654 A1 | 10/2010 | Prestenback et al. |
| 2011/0015779 A1 | 1/2011 | D'Andrea et al. |
| 2011/0029412 A1 | 2/2011 | Laughlin et al. |
| 2011/0060449 A1 | 3/2011 | Wurman et al. |
| 2011/0087354 A1 | 4/2011 | Tye et al. |
| 2011/0103924 A1 | 5/2011 | Watt et al. |
| 2011/0103925 A1 | 5/2011 | Welch et al. |
| 2011/0112758 A1 | 5/2011 | D'Andrea et al. |
| 2011/0125312 A1 | 5/2011 | D'Andrea et al. |
| 2011/0130866 A1 | 6/2011 | D'Andrea et al. |
| 2011/0130954 A1 | 6/2011 | D'Andrea et al. |
| 2011/0153063 A1 | 6/2011 | Wurman et al. |
| 2011/0157155 A1 | 6/2011 | Turner et al. |
| 2011/0158504 A1 | 6/2011 | Turner et al. |
| 2011/0164030 A1 | 7/2011 | Gay et al. |
| 2011/0231013 A1 | 9/2011 | Smoot et al. |
| 2011/0248837 A1 | 10/2011 | Israr et al. |
| 2011/0296944 A1 | 12/2011 | Carter et al. |
| 2011/0304633 A1 | 12/2011 | Beardsley et al. |
| 2012/0041677 A1 | 2/2012 | D'Andrea et al. |
| 2012/0079606 A1 | 3/2012 | Evans et al. |
| 2012/0084450 A1 | 4/2012 | Nagamati et al. |
| 2012/0143374 A1 | 6/2012 | Mistry et al. |
| 2012/0143427 A1 | 6/2012 | Hoffman et al. |
| 2012/0173393 A1 | 7/2012 | Acuff et al. |
| 2012/0185218 A1 | 7/2012 | Bickel et al. |
| 2012/0282070 A1 | 11/2012 | D'Andrea et al. |
| 2012/0323746 A1 | 12/2012 | Mountz et al. |
| 2013/0054005 A1 | 2/2013 | Stevens et al. |
| 2013/0054021 A1 | 2/2013 | Murai et al. |
| 2013/0073087 A1 | 3/2013 | Irmler et al. |
| 2013/0079930 A1 | 3/2013 | Mistry et al. |
| 2013/0103185 A1 | 4/2013 | Wurman et al. |
| 2013/0103552 A1 | 4/2013 | Hoffman et al. |
| 2013/0121797 A1 | 5/2013 | Welch et al. |
| 2013/0131865 A1 | 5/2013 | Yamane |
| 2013/0145953 A1 | 6/2013 | Crawford et al. |
| 2013/0173049 A1 | 7/2013 | Brunner et al. |
| 2013/0204429 A1 | 8/2013 | D'Andrea et al. |
| 2013/0204480 A1 | 8/2013 | D'Andrea et al. |
| 2013/0204981 A1 | 8/2013 | Brundage et al. |
| 2013/0211977 A1 | 8/2013 | Lyon et al. |
| 2013/0231933 A1 | 9/2013 | Hajishirzi et al. |
| 2013/0238122 A1 | 9/2013 | Hodgins et al. |
| 2013/0246229 A1 | 9/2013 | Mountz et al. |
| 2013/0251480 A1 | 9/2013 | Watt et al. |
| 2013/0280493 A1 | 10/2013 | Jackson |
| 2013/0302132 A1 | 11/2013 | D'Andrea |
| 2013/0304253 A1 | 11/2013 | Wurman et al. |
| 2013/0321408 A1 | 12/2013 | Turner et al. |
| 2013/0340004 A1 | 12/2013 | Prestenback et al. |
| 2014/0046469 A1 | 2/2014 | Bickel et al. |
| 2014/0100690 A1 | 4/2014 | Wurman et al. |
| 2014/0135977 A1 | 5/2014 | Wurman et al. |
| 2014/0188671 A1 | 7/2014 | Mountz et al. |
| 2014/0195040 A1 | 7/2014 | Wurman et al. |
| 2014/0198948 A1 | 7/2014 | Sigal et al. |
| 2014/0214162 A1 | 7/2014 | Smoot et al. |
| 2014/0228999 A1 | 8/2014 | D'Andrea et al. |
| 2014/0232818 A1 | 8/2014 | Carr et al. |
| 2014/0236413 A1 | 8/2014 | D'Andrea et al. |
| 2014/0249670 A1 | 9/2014 | Yamane |
| 2014/0249693 A1 | 9/2014 | Stark et al. |
| 2014/0250526 A1 | 9/2014 | Khanna et al. |
| 2014/0257553 A1 | 9/2014 | Shakes et al. |
| 2014/0270906 A1 | 9/2014 | Jackson |
| 2014/0292770 A1 | 10/2014 | Beardsley et al. |
| 2014/0294360 A1 | 10/2014 | Raptis et al. |
| 2014/0303773 A1 | 10/2014 | Wurman et al. |
| 2014/0309781 A1 | 10/2014 | Hodgins et al. |
| 2014/0324761 A1 | 10/2014 | Yedidia et al. |
| 2014/0330425 A1 | 11/2014 | Stevens et al. |
| 2014/0330426 A1 | 11/2014 | Brunner et al. |
| 2014/0343714 A1 | 11/2014 | Clark et al. |
| 2014/0350831 A1 | 11/2014 | Hoffman et al. |
| 2014/0358263 A1 | 12/2014 | Irmler et al. |
| 2015/0012396 A1 | 1/2015 | Puerini et al. |
| 2015/0019391 A1 | 1/2015 | Kumar et al. |
| 2015/0023490 A1 | 1/2015 | Jay et al. |
| 2015/0032295 A1 | 1/2015 | Stark et al. |

FOREIGN PATENT DOCUMENTS

| | | |
|---|---|---|
| CA | 2654258 A1 | 12/2007 |
| CA | 2654260 A1 | 12/2007 |
| CA | 2654263 A1 | 12/2007 |
| CA | 2654336 A1 | 12/2007 |
| CA | 2654471 A1 | 12/2007 |
| CA | 2748398 A1 | 12/2007 |
| CA | 2748407 A1 | 12/2007 |
| CA | 2750043 A1 | 12/2007 |
| CA | 2781857 A1 | 12/2007 |
| CA | 2838044 A1 | 12/2007 |
| CA | 2866664 A1 | 12/2007 |
| CA | 2671955 A1 | 7/2008 |
| CA | 2673025 A1 | 7/2008 |
| CA | 2674241 A1 | 7/2008 |
| CA | 2703737 A1 | 5/2009 |
| CA | 2703740 A1 | 5/2009 |
| CA | 2754626 A1 | 9/2010 |
| CA | 2514523 C | 5/2011 |
| CA | 2778111 A1 | 5/2011 |
| CA | 2784874 A1 | 7/2011 |
| CA | 2868578 A1 | 7/2011 |
| CA | 2654295 C | 8/2013 |

(56) References Cited

FOREIGN PATENT DOCUMENTS

| | | |
|---|---|---|
| CN | 103108815 A | 5/2013 |
| DE | 10341313 A1 | 4/2005 |
| EP | 1711241 A2 | 10/2006 |
| EP | 1799540 A2 | 6/2007 |
| EP | 1866856 A1 | 12/2007 |
| EP | 1920396 A2 | 5/2008 |
| EP | 2036012 A2 | 3/2009 |
| EP | 2036014 A2 | 3/2009 |
| EP | 2036024 A2 | 3/2009 |
| EP | 2038716 A2 | 3/2009 |
| EP | 2044495 A2 | 4/2009 |
| EP | 2047376 A2 | 4/2009 |
| EP | 2100264 A2 | 9/2009 |
| EP | 2102091 A1 | 9/2009 |
| EP | 2115620 A2 | 11/2009 |
| EP | 1590272 B1 | 8/2010 |
| EP | 2220859 A2 | 8/2010 |
| EP | 2233387 A1 | 9/2010 |
| EP | 2306744 A2 | 4/2011 |
| EP | 2306745 A2 | 4/2011 |
| EP | 2339497 A2 | 6/2011 |
| EP | 2044494 B1 | 10/2011 |
| EP | 2411946 A1 | 2/2012 |
| EP | 2239106 B1 | 3/2012 |
| EP | 2471249 A1 | 7/2012 |
| EP | 2493794 A1 | 9/2012 |
| EP | 2499067 A2 | 9/2012 |
| EP | 2197561 B1 | 10/2012 |
| EP | 2407845 B1 | 4/2013 |
| EP | 2596922 A2 | 5/2013 |
| EP | 2619685 A1 | 7/2013 |
| EP | 2653281 A2 | 10/2013 |
| WO | 2004066124 A2 | 8/2004 |
| WO | 2004107616 A2 | 12/2004 |
| WO | 2005069755 A2 | 8/2005 |
| WO | 2005098706 A2 | 10/2005 |
| WO | 2006042347 A2 | 4/2006 |
| WO | 2006044108 A2 | 4/2006 |
| WO | 2006055925 A2 | 5/2006 |
| WO | 2007011814 A2 | 1/2007 |
| WO | 2007145749 A2 | 12/2007 |
| WO | 2007149194 A2 | 12/2007 |
| WO | 2007149196 A2 | 12/2007 |
| WO | 2007149227 A2 | 12/2007 |
| WO | 2007149703 A2 | 12/2007 |
| WO | 2007149711 A2 | 12/2007 |
| WO | 2007149712 A2 | 12/2007 |
| WO | 2008016899 A2 | 2/2008 |
| WO | 2008085628 A2 | 7/2008 |
| WO | 2008085638 A2 | 7/2008 |
| WO | 2008085639 A1 | 7/2008 |
| WO | 2009036199 A2 | 3/2009 |
| WO | 2009064775 A1 | 5/2009 |
| WO | 2009064782 A2 | 5/2009 |
| WO | 2009151797 A2 | 12/2009 |
| WO | 2010110981 A1 | 9/2010 |
| WO | 2011025824 A1 | 3/2011 |
| WO | 2011059596 A1 | 5/2011 |
| WO | 2011087583 A2 | 7/2011 |
| WO | 2012040385 A1 | 3/2012 |
| WO | 2013121113 A1 | 8/2013 |
| WO | 2013126048 A1 | 8/2013 |
| WO | 2013173047 A1 | 11/2013 |
| WO | 2014055716 A1 | 4/2014 |
| WO | 2014077819 A1 | 5/2014 |
| WO | 2014082043 A2 | 5/2014 |
| WO | 2014116947 A1 | 7/2014 |

OTHER PUBLICATIONS

Peter Whitney et al. "A Low-Friction Passive Fluid Transmission and Fluid-Tendon Soft Actuator", IEEE/RSJ International Conference on Intelligent Robots and Systems (IROS) 2014, Sep. 14, 2014 (pp. 4) http://www.disneyresearch.com/publication/fluid-soft-actuator/.

MODULAR HANGING LASERS TO PROVIDE EASY INSTALLATION IN A DISTRIBUTION CENTER

CLAIM OF PRIORITY

This application is Continuation patent application of and claims priority to the U.S. Utility patent application Ser. No. 14/520,353 titled, MODULAR HANGING LASERS TO ENABLE REAL-TIME CONTROL IN A DISTRIBUTION CENTER filed on Oct. 22, 2014.

FIELD OF TECHNOLOGY

This disclosure relates generally to the communications field, more particularly, to modular hanging lasers to provide easy installation in a distribution center.

BACKGROUND

A distribution center (e.g., a warehouse, a fulfillment center, a cross-dock facility, a bulk break center, an unstructured storage area, and/or a package handling center) may be a physical space in which inventory (e.g., products) are stored for downstream delivery to retailers or consumers. The distribution center may allow a single location to stock a number of products. Some organizations may operate retail and/or direct-to-consumer distribution in a single facility to share investments (e.g., in space, equipment, labor resources, and/or inventory as applicable).

The distribution server may have a series of rows having stacked shelving. In addition, the distribution center may have a wire (e.g., an overhead steel wire, a location marker line) on which signs are placed that run along the set of rows and/or stacked shelving. The wire may be used to manually hang up signboards (e.g., paper, plastic, chalkboard) to inform workers generally of where things are.

However, the wire may not be useful to workers in the distribution center seeking to find inventory to fulfill a particular request. Workers may need to manually look at a map, discern the labels of each product, and/or search for products on shelves by reading individual labels. This may be time consuming and inefficient. When a new worker is employed, it may take time for them to develop a mental map of the distribution center. This may increase cost. Further, such manual processes may be error prone because they may depend on human labor. Rewiring and/or rerouting of the distribution center to accommodate customized solutions may be difficult to modify, inefficient, expensive, and/or cost prohibitive.

SUMMARY

Disclosed are a system, device and/or an apparatus of modular hanging lasers to enable real-time control in a distribution center.

In one aspect, a laser assembly includes a first support member having a curved upper hook, a second support member having the curved upper hook. The laser assembly further includes a printed circuit board in between the first support member and the second support member that is physically coupled with the first support member at a first rotation point of the printed circuit board and the second support member at a second rotation point of the printed circuit board. The printed circuit board has a laser whose orientation is adjustable through a protrusion of the printed circuit board that extends from a curved guide of the first support member. The second support member is manually adjusted by a user of the laser assembly by shifting the protrusion along the curved guide based on a graduation indicator adjacent to the curved guide and on the first support member and/or the second support member.

The laser may be mounted straight up on a set of leads and/or an entire printed circuit board may rotate directly when the first support member and/or the second support member may be manually adjusted by the user of the laser assembly. The laser assembly may be attached to a first wire of a distribution center above a row of the distribution center having a shelving, an inventory, and/or storage compartments along the row. The laser assembly may be attached to a second wire of the distribution center above an area of the distribution center having a walkway, a pallet, and/or a stock cart of the distribution center. The laser assembly may be attachable to the first wire and/or the second wire using a grappling hook from a floor of the distribution center by the user. The user may attach the laser assembly to a rod of the grappling hook that may extend perpendicularly from an end closest to the first wire and/or the second wire above the floor using the grappling hook having attached through the rod of the grappling hook to the laser assembly.

The grappling hook may attach from a side entry of the laser assembly formed by the curved hooks of the laser assembly. The laser assembly may produce a test spot usable for a testing operation and/or an aiming operation during installation of the laser assembly. A holographic lens may be used to create a shape that may be beamed using the laser to a location on a ground. A hologram shape may be projected on a wide angle reflective tape on a floor. The multiple laser assemblies may be attachable with each other in a daisy chain through a shift-register mechanism. The multiple laser assemblies may be communicatively coupled together in a manner such that the curved upper hooks of each laser assembly may remain unblocked from communication cables extending below the curved upper hooks from each of the multiple laser assemblies in the daisy chain.

A single radio access point may be attached to one end of the daisy chain and/or may be able to communicate wirelessly using a server device through a network to receive commands to direct each of the multiple laser assemblies in the daisy chain. Each of the multiple laser assemblies in the daisy chain may be slidable together along the first wire and/or the second wire until affixed by stoppers attached to a wire on opposite ends of the daisy chain. The multiple laser assemblies may be adjusted on the floor prior to placement on the first wire and/or the second wire by adjustment of the graduation indicator. A beam of each of the multiple laser assembles may be optimally aligned on the floor prior to placement on the multiple laser assemblies on the first wire and/or the second wire using the grappling hook.

The beam of each of the multiple laser assembles may be adjustable over 80 degree angle in a distance from a base angle of the printed circuit board. There may be multiple ones of the lasers. The multiple ones of the lasers may produce beams in different colors such that different colors may indicate a particular worker to pick and/or put an item at the distribution center.

The multiple ones of the lasers may produce beams in different flashing patterns such that different patterns may indicate which user may be picked and/or placed the item at the distribution center. The patterns may be based on a timing pattern, frequency pattern, an intensity pattern, and/or a moving light pattern. The laser assembly also may have a diffused LED to make an active device visible from a distance of 50 meters. The first rotation point and/or the second rotation point may be fixed using a screw. The laser assembly rotatable on a single-axis gimbal and/or may include twelve lasers to produce a set of two-digit numbers from 1 to 29 using a digit-forming holographic lens (pattern) in front of each of the twelve lasers.

In another aspect a laser assembly includes a first support member having a curved upper hook, a second support member having the curved upper hook, a printed circuit board in between the first support member and the second support member. A laser assembly is physically coupled with the first support member at a first rotation point of the printed circuit board and with the second support member at a second rotation point of the printed circuit board. The printed circuit board has a laser whose orientation is adjustable. The laser assembly is attached to a first wire of a distribution center above a row of the distribution center having a shelving, an inventory, and/or storage compartments along the row.

In yet another aspect, a laser assembly includes a first support member having a curved upper hook, a second support member having the curved upper hook, a printed circuit board in between the first support member and the second support member. The laser assembly is physically coupled with the first support member at a first rotation point of the printed circuit board. The laser assembly is physically coupled with the second support member at a second rotation point of the printed circuit board. The printed circuit board has a laser whose orientation is adjustable. The laser assembly is attached to a first wire of a distribution center above a row of the distribution center having a shelving, an inventory, and/or storage compartments along the row.

The laser assembly is attachable to the first wire and/or the second wire using a grappling hook from a floor of the distribution center by a user. The user attaches the laser assembly to a rod of the grappling hook that extends perpendicularly from an end closest to the first wire and/or the second wire above the floor using the grappling hook having attached through the rod of the grappling hook the laser assembly. The grappling hook attaches from a side entry of the laser assembly formed by the curved hooks of the laser assembly.

The methods and systems disclosed herein may be implemented in any means for achieving various aspects, and may be executed in a form of a machine-readable medium embodying a set of instructions that, when executed by a machine, cause the machine to perform any of the operations disclosed herein.

Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Figure 1:
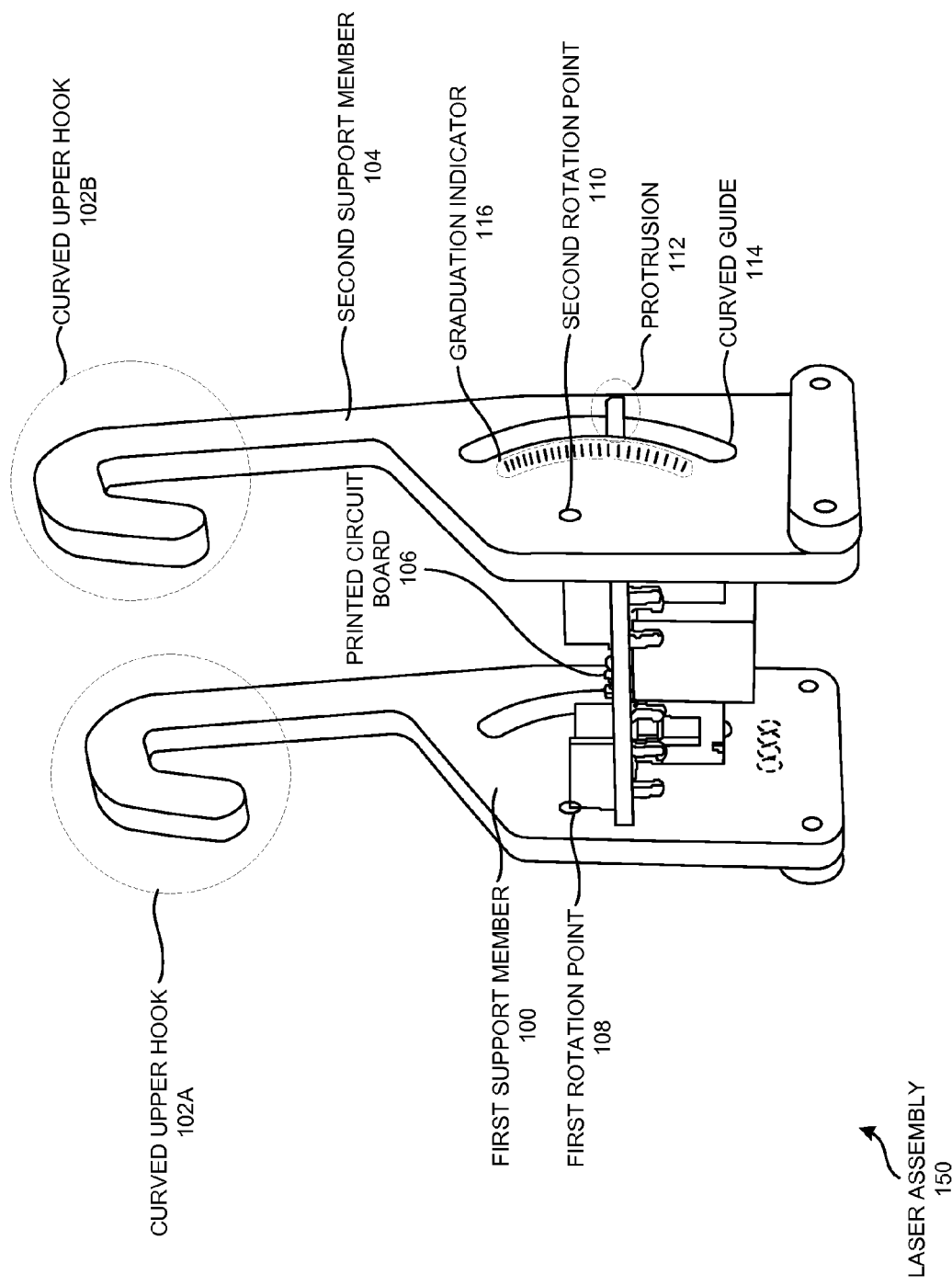
FIG. 1 illustrates a laser assembly showing modular hanging lasers to enable real-time control in a distribution center, according to one embodiment.

Other features of the present embodiments will be apparent from the accompanying drawings and from the detailed description that follows.

DETAILED DESCRIPTION

Example embodiments, as described below, may be used to provide a system, device and/or an apparatus of modular hanging lasers to enable real-time control in a distribution center. Although, the present embodiments have been described with reference to specific example embodiments, it will be evident that various modifications and changes may be made to these embodiments without departing from the broader spirit and scope of the various embodiments.

In one embodiment, a laser assembly 150 includes a first support member 100 having a curved upper hook 102A, a second support member 104 having the curved upper hook 102B. The laser assembly 150 further includes a printed circuit board 106 in between the first support member 100 and the second support member 104 that is physically coupled with the first support member 100 at a first rotation point 108 of the printed circuit board 106 and the second support member 104 at a second rotation point 110 of the printed circuit board 106. The printed circuit board 106 has a laser whose orientation is adjustable when a protrusion 112 of the printed circuit board 106 that extends from a curved guide 114 of the first support member 100 is adjusted (e.g., moved, rotated, changed, displaced). The second support member 104 is manually adjusted by a user of the laser assembly 150 by shifting the protrusion 112 along the curved guide 114 based on a graduation indicator 116 adjacent to the curved guide 114 and on the first support member 100 and/or the second support member 104.

The laser may be mounted straight up on a set of leads. The printed circuit board 106 may rotate directly when the first support member 100 and/or the second support member 104 is manually adjusted by the user of the laser assembly 150. The laser assembly 150 may be attached to a first wire 800A-N of a distribution center above a row of the distribution center having a shelving, an inventory, and/or storage compartments along the row. The laser assembly 150 may be attached to a second wire 802A-N of the distribution center above an area of the distribution center having a walkway, a pallet, and/or a stock cart of the distribution center. The laser assembly 150 may be attachable to the first wire 800A-N and/or the second wire 802A-N using a grappling hook from a floor of the distribution center by the user. The user may attach laser assembly 150 to a rod of the grappling hook that may extend perpendicularly from an end closest to the first wire 800A-N and/or the second wire 802A-N above the floor using the grappling hook having attached through the rod 704 of the grappling hook to the laser assembly 150.

The grappling hook 702 may attach from a side entry of the laser assembly 150 formed by the curved hooks of the laser assembly 150. The laser assembly 150 may produce a test spot usable for a testing operation and/or an aiming operation during installation of the laser assembly 150. A holographic lens may be used to create a shape that may be beamed using the laser to a location on a ground. A hologram shape may be projected on a wide angle reflective tape on a floor. The multiple laser assemblies 150A-N may be attachable with each other in a daisy chain through a shift-register mechanism. The multiple laser assemblies 150A-N may be communicatively coupled together in a manner such that the curved upper hooks 102A-B of each laser assembly 150 may remain unblocked from communication cables 202 extending below the curved upper hooks 102A-B from each of the multiple laser assemblies 150A-N in the daisy chain.

A single radio access point 204 may be attached to one end of the daisy chain and/or may be able to communicate wirelessly using a server device 206 through a network 208 to receive commands to direct each of the multiple laser assemblies 150A-N in the daisy chain. Each of the multiple laser assemblies 150A-N in the daisy chain may be slidable together along the first wire 800A-N and/or the second wire 802A-N until affixed by stoppers attached to a wire on opposite ends of the daisy chain. The multiple laser assemblies 150A-N may be adjusted on the floor prior to placement on the first wire 800A-N and/or the second wire 802A-N by adjustment of the graduation indicator 116. A beam of each of the multiple laser assembles may be optimally aligned on the floor prior to placement on the multiple laser assemblies 150A-N on the first wire 800A-N and/or the second wire 802A-N using the grappling hook.

The beam of each of the multiple laser assembles may be adjustable over 80 degree angle in a distance from a base angle of the printed circuit board 106. There may be multiple ones of the laser. The multiple ones of the lasers may produce beams in different colors such that different colors may indicate a particular worker to pick and/or put an item at the distribution center.

The multiple ones of the lasers may produce beams in different flashing patterns such that different patterns may indicate which user may be picked and/or placed the item at the distribution center. The patterns may be based on a timing pattern, frequency pattern, an intensity pattern, and/or a moving light pattern. The laser assembly 150 also may have a diffused LED to make an active device visible from a distance of 50 meters. The first rotation point 108 and/or the second rotation point 110 may be fixed using a screw. The laser assembly 150 rotatable on a single-axis gimbal and/or may include twelve lasers to produce a set of two-digit numbers from 1 to 29 using a digit-forming holographic lens (pattern) in front of each of the twelve lasers.

In another embodiment a laser assembly 150 includes a first support member 100 having a curved upper hook 102A, a second support member 104 having the curved upper hook 102B, a printed circuit board 106 in between the first support member 100 and the second support member 104. A laser assembly 150 is physically coupled with the first support member 100 at a first rotation point 108 of the printed circuit board 106 and with the second support member 104 at a second rotation point 110 of the printed circuit board 106. The printed circuit board 106 has a laser whose orientation is adjustable. The laser assembly 150 is attached to a first wire 800A-N of a distribution center above a row of the distribution center having a shelving, an inventory, and/or storage compartments along the row.

In yet another embodiment, a laser assembly 150 includes a first support member 100 having a curved upper hook 102A, a second support member 104 having the curved upper hook 102B, a printed circuit board 106 in between the first support member 100 and the second support member 104. The laser assembly 150 is physically coupled with the first support member 100 at a first rotation point 108 of the printed circuit board 106. The laser assembly 150 is physically coupled with the second support member 104 at a second rotation point 110 of the printed circuit board 106. The printed circuit board 106 has a laser whose orientation is adjustable. The laser assembly 150 is attached to a first wire 800A-N of a distribution center above a row of the distribution center having a shelving, an inventory, and/or storage compartments along the row.

The laser assembly 150 is attachable to the first wire 800A-N and/or the second wire 802A-N using a grappling hook 702 from a floor of the distribution center by a user. The user attaches the laser assembly 150 to a rod 704 of the grappling hook 702 that extends perpendicularly from an end closest to the first wire 800A-N and/or the second wire 802A-N above the floor using the grappling hook 702 having attached through the rod of the grappling hook the laser assembly 150. The grappling hook 702 attaches from a side entry of the laser assembly 150 formed by the curved hooks of the laser assembly 150.

FIG. 1 illustrates a laser assembly 150 showing modular hanging lasers to enable real-time control in a distribution center, according to one embodiment.

Particularly, FIG. 1 illustrates a first support member 100, curved upper hooks 102A-B, a second support member 104, a printed circuit board 106, a first rotation point 108, a second rotation point 110, a protrusion 112, a curved guide 114, and a graduation indicator 116, according to one embodiment.

A first support member 100 may be a principal component that may keep the laser assembly 150 upright, according to one embodiment. Curved upper hooks 102A-102B may be a warped and/or sharply bent device, usually of metal, used to catch, drag, suspend, and/or fasten the laser assembly, according to one embodiment. A second support member 104 may be a subsequent component that may keep the laser assembly 150 upright, according to one embodiment. A printed circuit board 106 may be an electronic circuit in which certain components and/or the connections between them may be formed by etching a metallic coating or by electrode position on one or both sides of a thin insulating board, according to one embodiment.

A first rotation point 108 may be a primary protrusion on which a related part may rotate and/or swing. The first rotation point 108 may be fixed using a screw, according to one embodiment. A second rotation point 110 may be another protrusion on which a related part may rotate and/or swing. The second rotation point 110 may be fixed using a screw, according to one embodiment. A protrusion 112 may be a part of the printed circuit board 106 that may extend from the curved guide 114 of the first support member 100 and the second support member 104, according to one embodiment. A curved guide 114 may be a curved rod showing the measurement based on the graduation indicator 116, according to one embodiment. A graduation indicator 116 may be a measurable variable used as a representation of an associated (but non-measured or non-measurable) factor or quantity adjacent to the curved guide 114, according to one embodiment.

Particularly, FIG. 1 illustrates the laser assembly 150 including the first support member 100 having the curved upper hook 102A and the second support member 104 having the curved upper hook 102B. The laser assembly 150 may further include the printed circuit board 106 in between the first support member 100 and the second support member 104. The laser assembly 150 may be physically coupled with the first support member 100 at a first rotation point 108 and with the second support member 104 at the second rotation point 110 of the printed circuit board 106, according to one embodiment.

The printed circuit board 106 may have a laser whose orientation may be adjustable when the protrusion 112 of the printed circuit board 106 may extend from the curved guide 114 of the first support member 100. The second support member 104 may be manually adjusted by the user 712 (as illustrated in FIG. 7) of the laser assembly 150 by shifting the protrusion 112 along the curved guide 114 and on the first support member 100 and/or the second support member 104, according to one embodiment.

Figure 7:
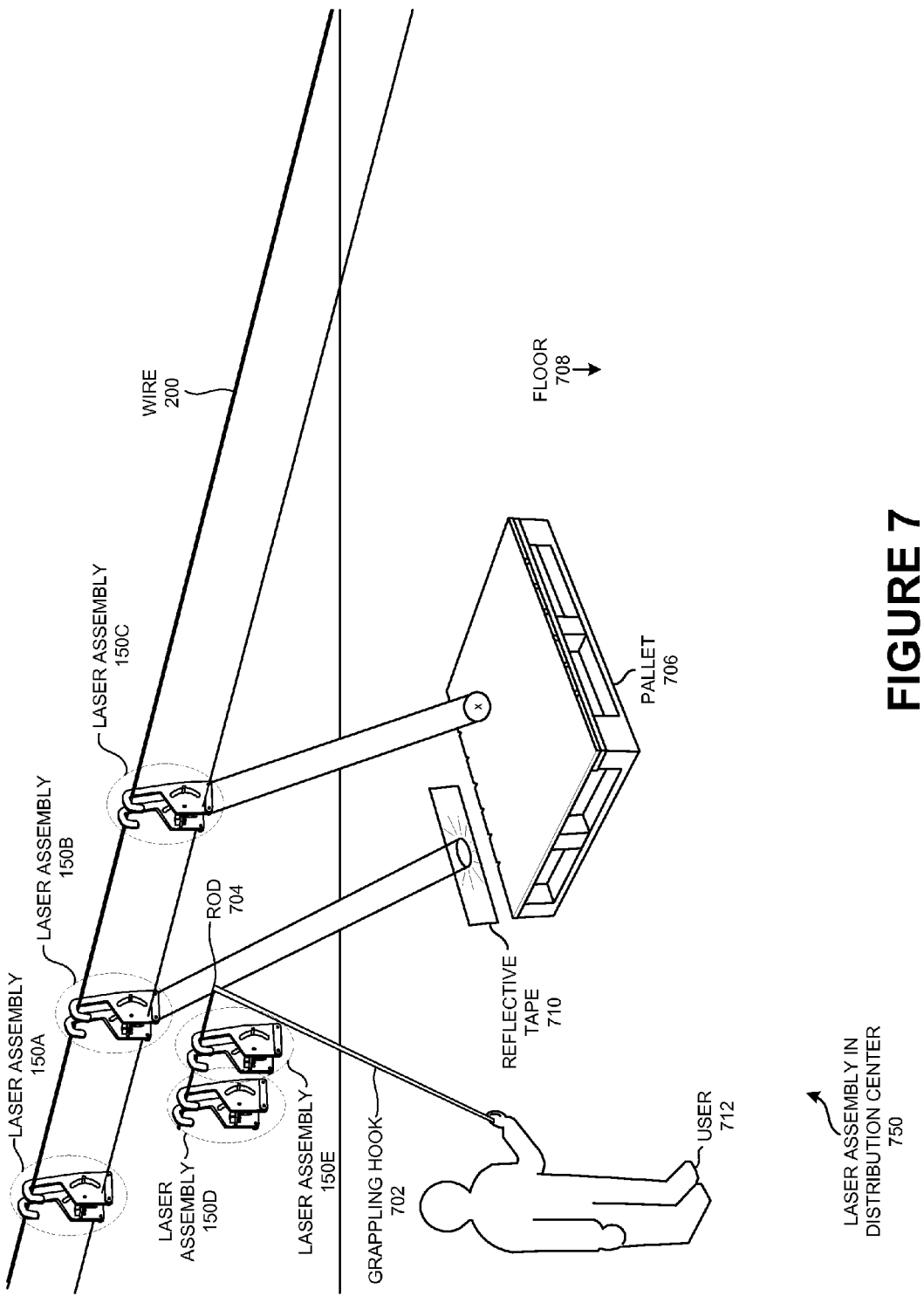
FIG. 7 illustrates laser assemblies in a distribution center showing the attachment of the laser assemblies from a floor using a grappling hook by a user, according to one embodiment.
Figure 8:
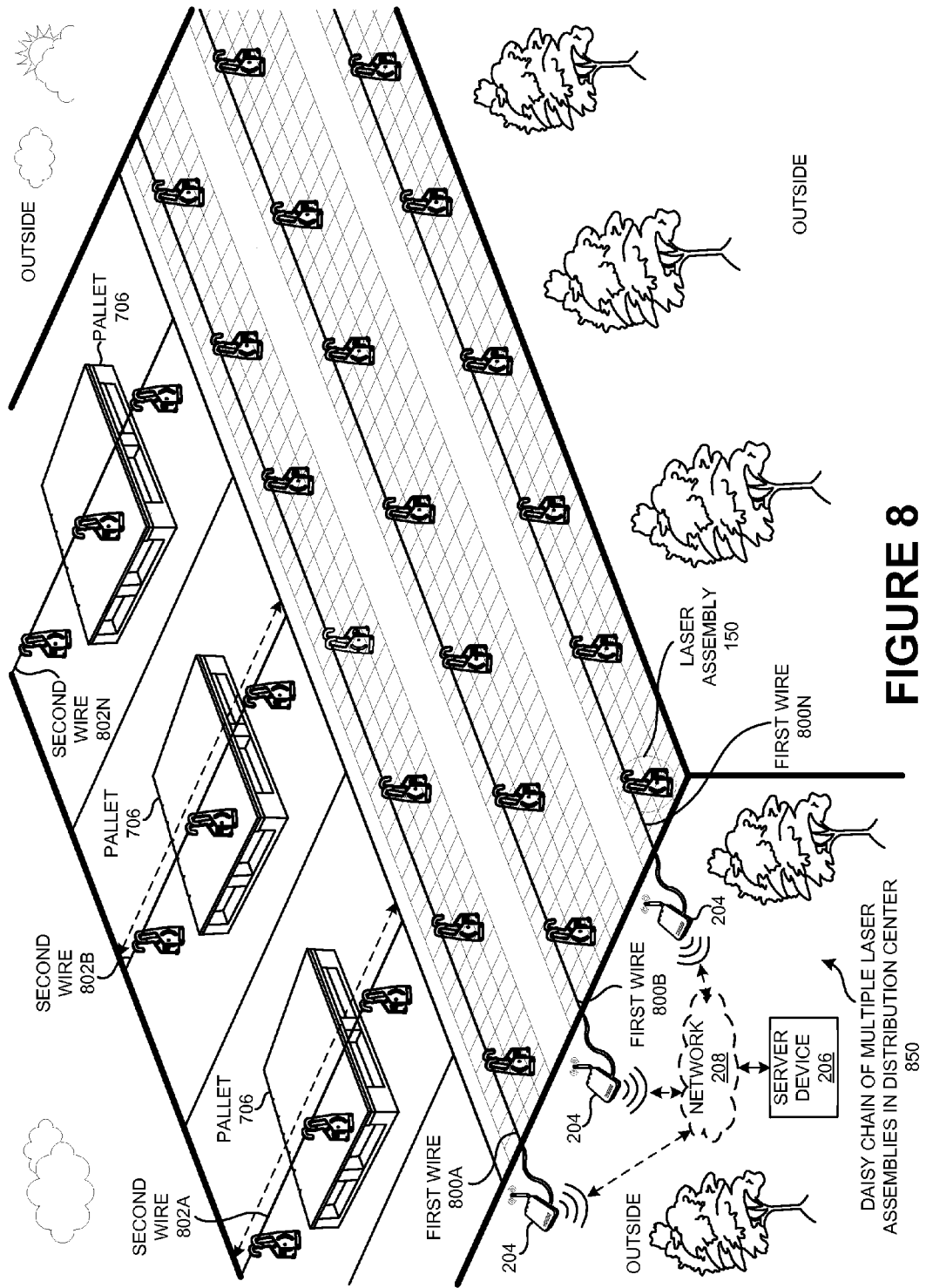
FIG. 8 is a daisy chain of multiple laser assemblies in distribution center, according to one embodiment.

A laser may be mounted straight up on a set of leads and the entire printed circuit board 106 may rotate directly when the first support member 100 and the second support member 104 are manually adjusted by the user 712 (as illustrated in FIG. 7) of the laser assembly 150. The laser assembly 150 may be attached to the second wire 802A-N (as illustrated in FIG. 8) of the distribution center (e.g., having a walkway, a pallet, and/or a stock cart) of the distribution center, according to one embodiment.

Figure 2:
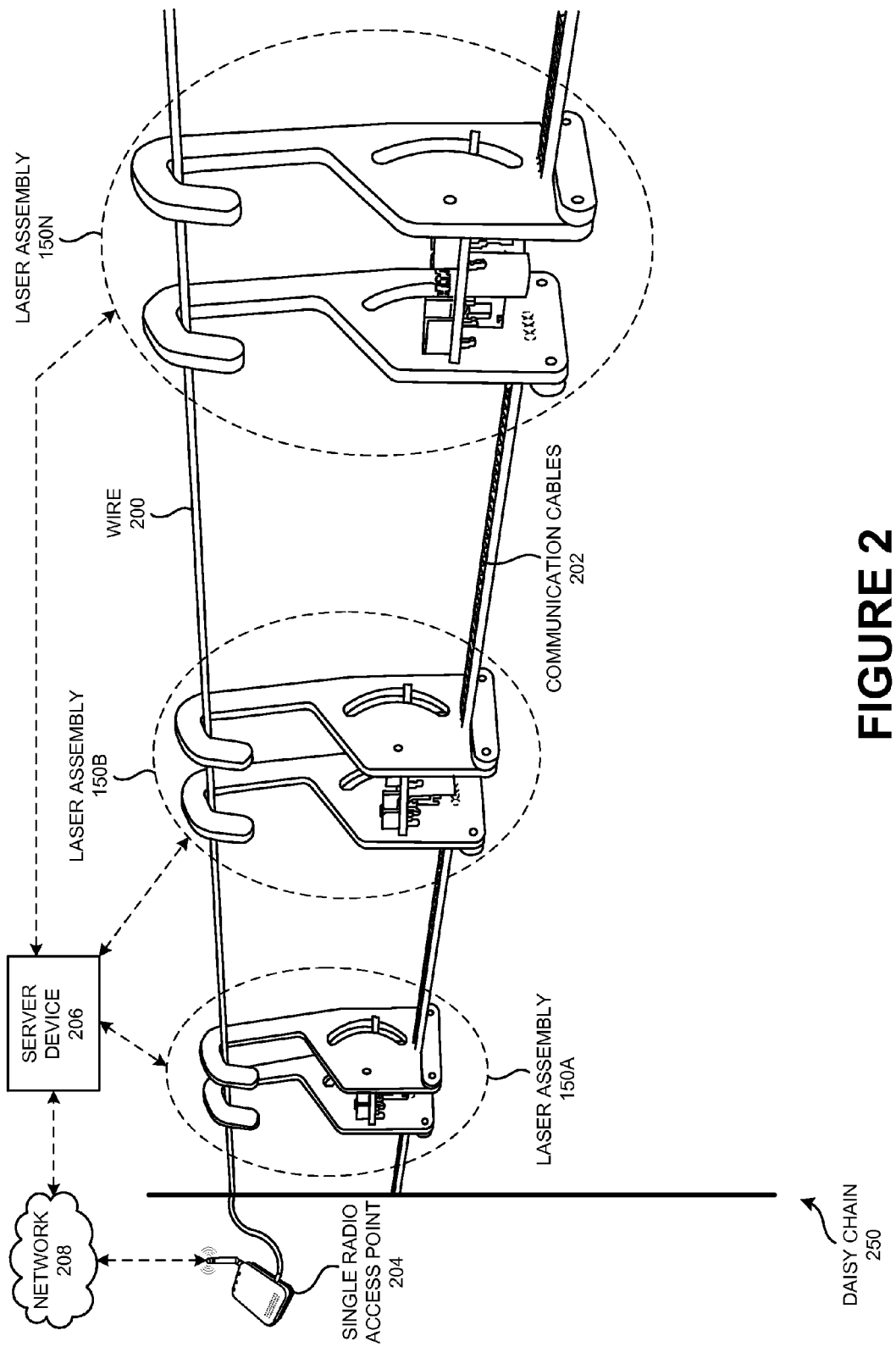
FIG. 2 illustrates a daisy chain of laser assemblies of FIG. 1 connected to each other through communication cables such that a single access point may communicate wirelessly using a server device through a network, according to one embodiment.

FIG. 2 illustrates a daisy chain 250 of laser assemblies of FIG. 1 connected to each other through communication cables 202 such that a single radio access point 204 may communicate wirelessly using a server device 206 through a network 208, according to one embodiment.

Particularly, FIG. 2 builds on FIG. 1, and further adds a wire 200, communication cables 202, a single radio access point 204, a server device 206 and a network 208, according to one embodiment.

A wire 200 may be a cable usually cylindrical, flexible strand or rod of metal. A wire 200 may be used to bear mechanical loads and/or electricity and telecommunications signals. The laser assembly may be attached to the wire of the distribution center, according to one embodiment. Communication cables 202 may be a means by which data (information) may travel through a network, according to one embodiment. A single radio access point 204 may be a device that allows wireless devices to connect to a network 208 (wired network) using Wi-Fi, or related standards. The single radio access point 204 may be able to communicate wirelessly using a server device 206 through the network 208, according to one embodiment.

A server device 206 may be a hardware and/or software that may be used by the single radio access point 204 to communicate wirelessly through the network 208, according to one embodiment. A network 208 may be a group of interconnected (via cable and/or wireless) peripherals that may be capable of receiving commands to direct each of the multiple assemblies in the daisy chain, according to one embodiment.

Particularly, FIG. 2 illustrates multiple laser assemblies 150A-N may be attachable with each other in a daisy chain through a shift-register mechanism in which the multiple laser assemblies 150A-N may be communicatively coupled together in a manner such that the curved upper hooks 102A-B of each laser assembly 150 may remain unblocked from communication cables 202 extending below the curved upper hooks 102A-B from each of the multiple laser assemblies 150A-N in the daisy chain, according to one embodiment.

The single radio access point 204 may be attached to one end of the daisy chain and may be able to communicate wirelessly using the server device 206 through the network 208 to receive commands to direct each of the multiple laser assemblies in the daisy chain. Each of the multiple laser assemblies in the daisy chain are slidable together along the first wire 800A-N and the second wire 802A-N until affixed by stoppers attached to a wire 200 on opposite ends of the daisy chain, according to one embodiment.

Figure 3:
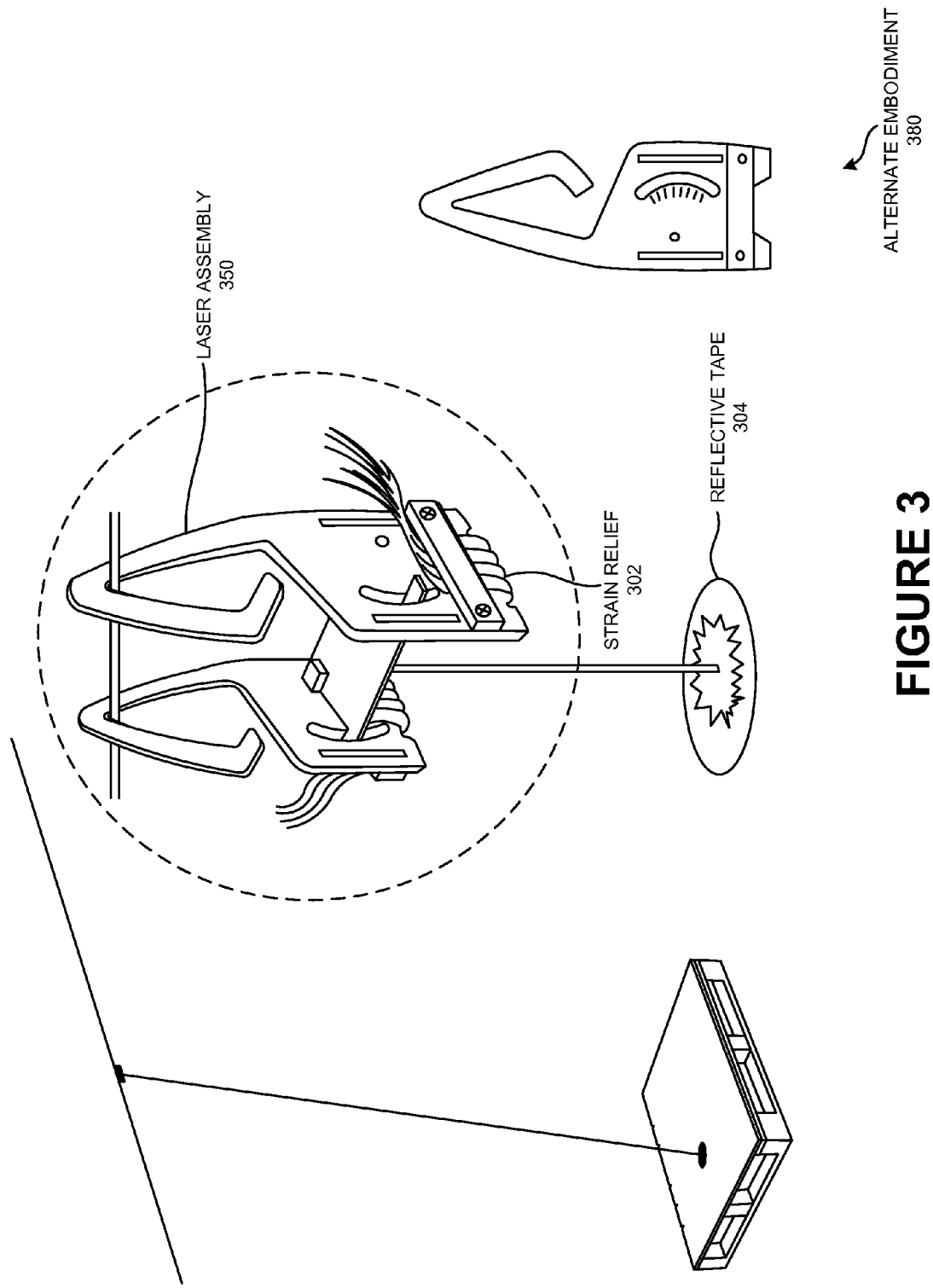
FIG. 3 illustrates an alternate embodiment of the laser assembly showing an alternative having some additional features to the laser assembly of FIG. 1, according to one embodiment.

FIG. 3 illustrates an alternate embodiment 380 of the laser assembly 350 showing an alternative having some additional features to the laser assembly 150 of FIG. 1, according to one embodiment.

Particularly, FIG. 3 illustrates a strain relief 302, a reflective tape 304, and a laser assembly 350, according to one embodiment.

A strain relief 302 may be typically a series of ridges at the point where the wire meets the connector or plug that allows flexibility in the wire without putting stress on that vulnerable point in the cord, according to one embodiment. A reflective tape 304 may be a wide angled durable, high-strength adhesive on the floor 708 (as shown in FIG. 7) used to clearly mark areas or objects, providing a reflective light that is cast off the tape, according to one embodiment. A laser assembly 350 may be one or more lasers used in supply chain applications, such as expanding, focusing, or shaping laser beams in the distribution center for pick, pack, and/or shipping operations. The laser assembly 350 may produce a test spot usable for a testing operation and/or an aiming operation during installation, according to one embodiment.

Particularly, FIG. 3 illustrates an alternate embodiment of the laser assembly 150 which may produce a test spot usable for a testing operation and an aiming operation during installation of the laser assembly 150. A holographic lens may be used to create a shape that may be beamed using the laser to a location on a ground. A hologram shape may be projected on a wide angle reflective tape 304 on the floor 708 (as illustrated in FIG. 7), according to one embodiment.

Figure 4:
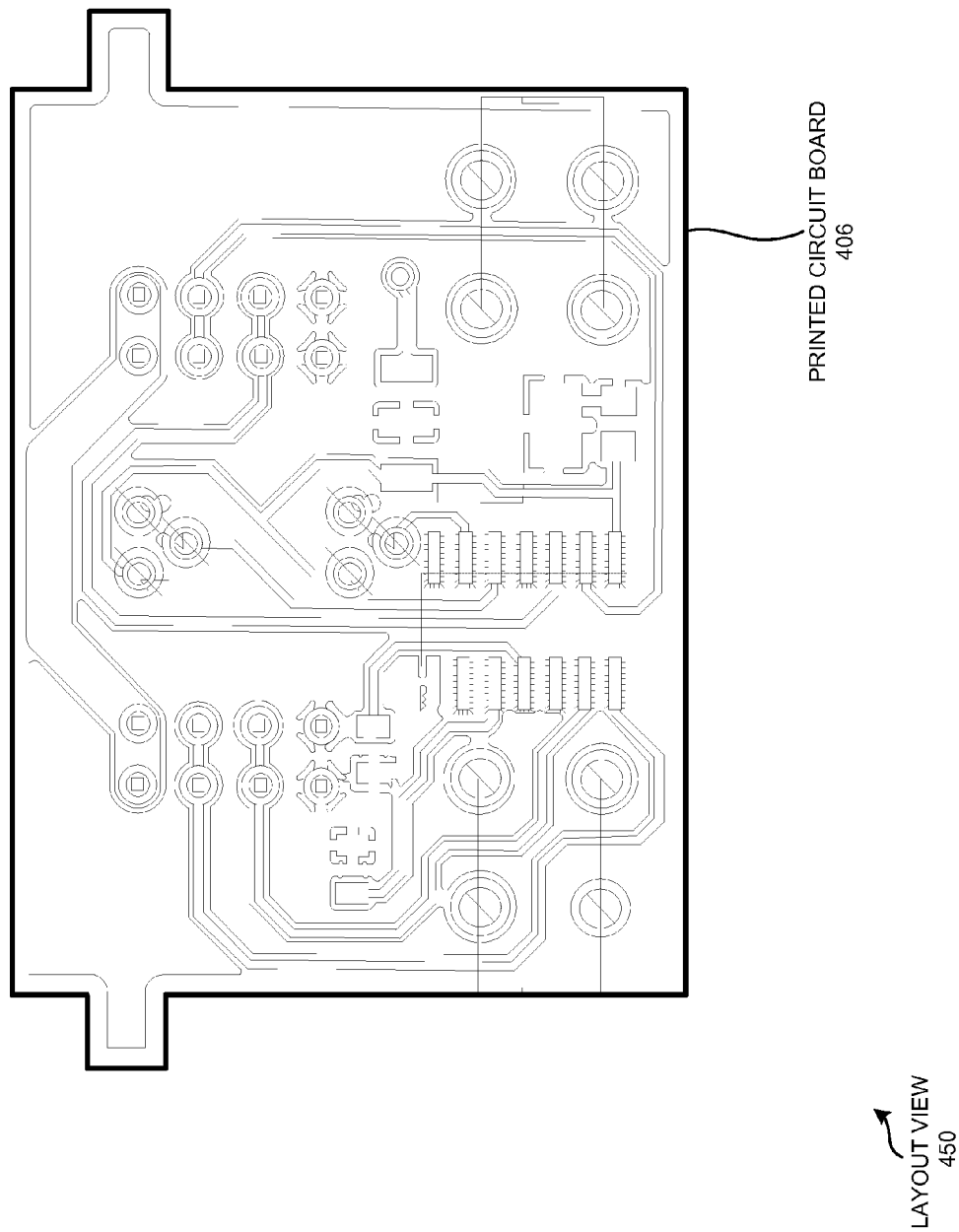
FIG. 4 is a layout view of printed circuit board illustrating exemplary assembly of printed circuit board in laser assembly of FIG. 1, according to one embodiment.

FIG. 4 is a layout view 450 of a printed circuit board 406 illustrating exemplary assembly of the printed circuit board 406 in the laser assembly 150 of FIG. 1, according to one embodiment.

A printed circuit board 406 may be a flat insulating sheet which may consist of thin strips of a conducting material such as copper, which have been etched from a layer fixed, and/or to which integrated circuits and other components are attached, according to one embodiment.

Particularly, FIG. 4 illustrates the printed circuit board 406 which may be placed in the laser assembly 150 showing protrusion from both sides. A laser may be mounted straight up on a set of leads and the entire printed circuit board 406 may rotate directly when the first support member 100 and the second support member 104 may be manually adjusted by the user 712 (as illustrated in FIG. 7) of the laser assembly 150.

The printed circuit board 406 may be made from glass reinforced plastic with copper tracks in the place of wires. Components may be fixed in position by drilling holes through the board, locating the components and then soldering them in place. The copper tracks may link the components together forming a circuit.

The printed circuit board 406 may be thin plates containing electronic components mostly found in electrical and communications devices. The plate may allow circuit components to transfer information and/or signals between each other as well as information to external devices. Printed circuit board 406 can be found in most of the devices (e.g., computers, televisions, cell phones, and other telecommunications devices). There are also different types for printed circuit board 406, from traditional computer motherboards to tiny flexible boards used in mobile phones and PDAs.

Figure 5:
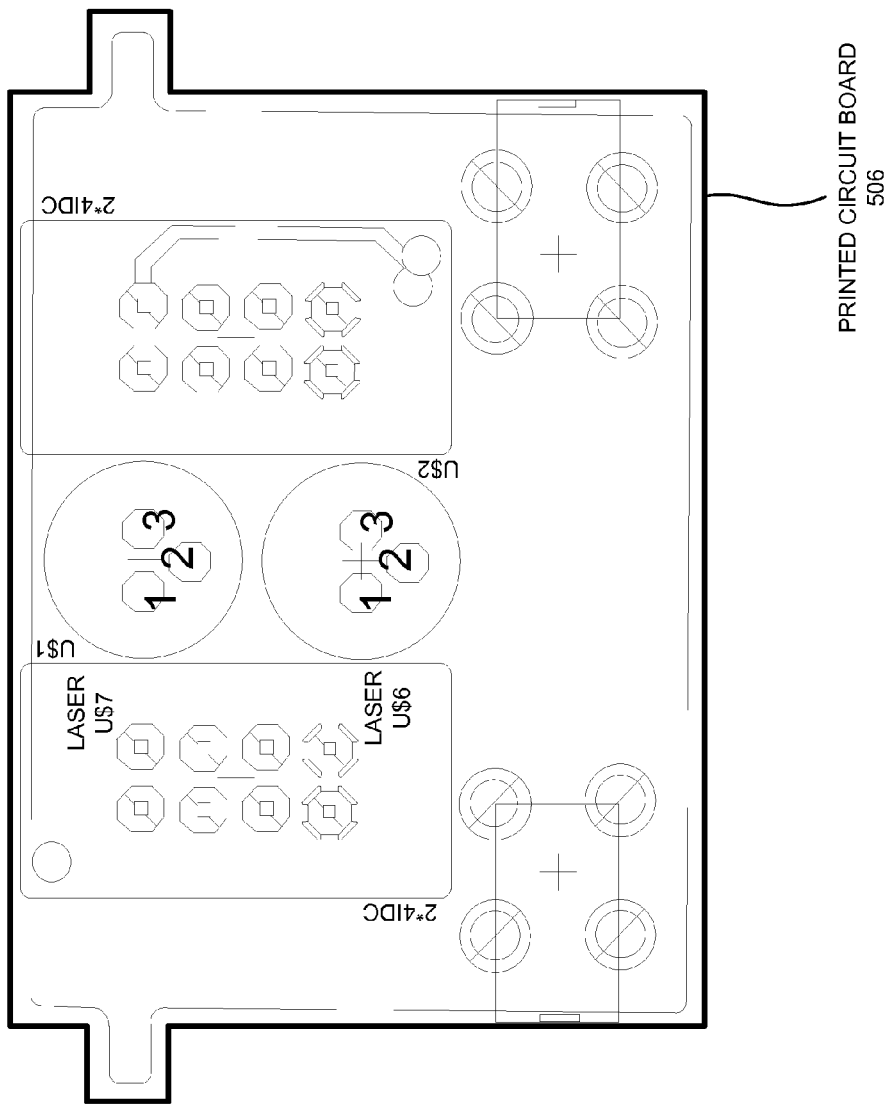
FIG. 5 is a layout view of printed circuit board illustrating exemplary assembly of printed circuit board in laser assembly of FIG. 1, according to one embodiment.

FIG. 5 is a layout view 550 of a printed circuit board 506 illustrating exemplary assembly of the printed circuit board 506 in laser assembly 150 of FIG. 1, according to one embodiment.

A printed circuit board 506 may be a flat insulating sheet which may consist of thin strips of a conducting material such as copper, which have been etched from a layer fixed, and/or to which integrated circuits and other components are attached, according to one embodiment. Particularly, FIG. 5 illustrates the printed circuit board 506 which may be placed in the laser assembly 150 showing protrusion from both sides. A laser may be mounted straight up on a set of leads and the entire printed circuit board 506 may rotate directly when the first support member 100 and the second support member 104 may be manually adjusted by the user 712 (as illustrated in FIG. 7) of the laser assembly 150.

A printed circuit board 506 may include one or more laser assemblies that may be used for beaming the lasers in the distribution center. PCB etching may be a subtractive method of making PCB prototypes in which surface material, generally copper, may be removed from the surface of a bare board, leaving only the circuit pattern. Laser PCB etching may require a bare board and an in-house laser cutting machine. After importing design schematics into the machine, it may etch the printed circuit board 106 using a high-powered UV or IR laser.

A printed circuit board 506 mechanically may support and/or electrically may connect electronic components using conductive tracks, pads and/or other features etched from copper sheets laminated onto a non-conductive substrate. Printed circuit board 506 can be single sided (one copper layer), double sided (two copper layers) or multi-layer. Conductors on different layers may be connected with plated-through holes called vias. Printed circuit board 506 may contain components such as capacitors, resistors and/or active devices which may be embedded in the substrate. Printed circuit board 506 may be used in all but the simplest electronic products.

Figure 6:
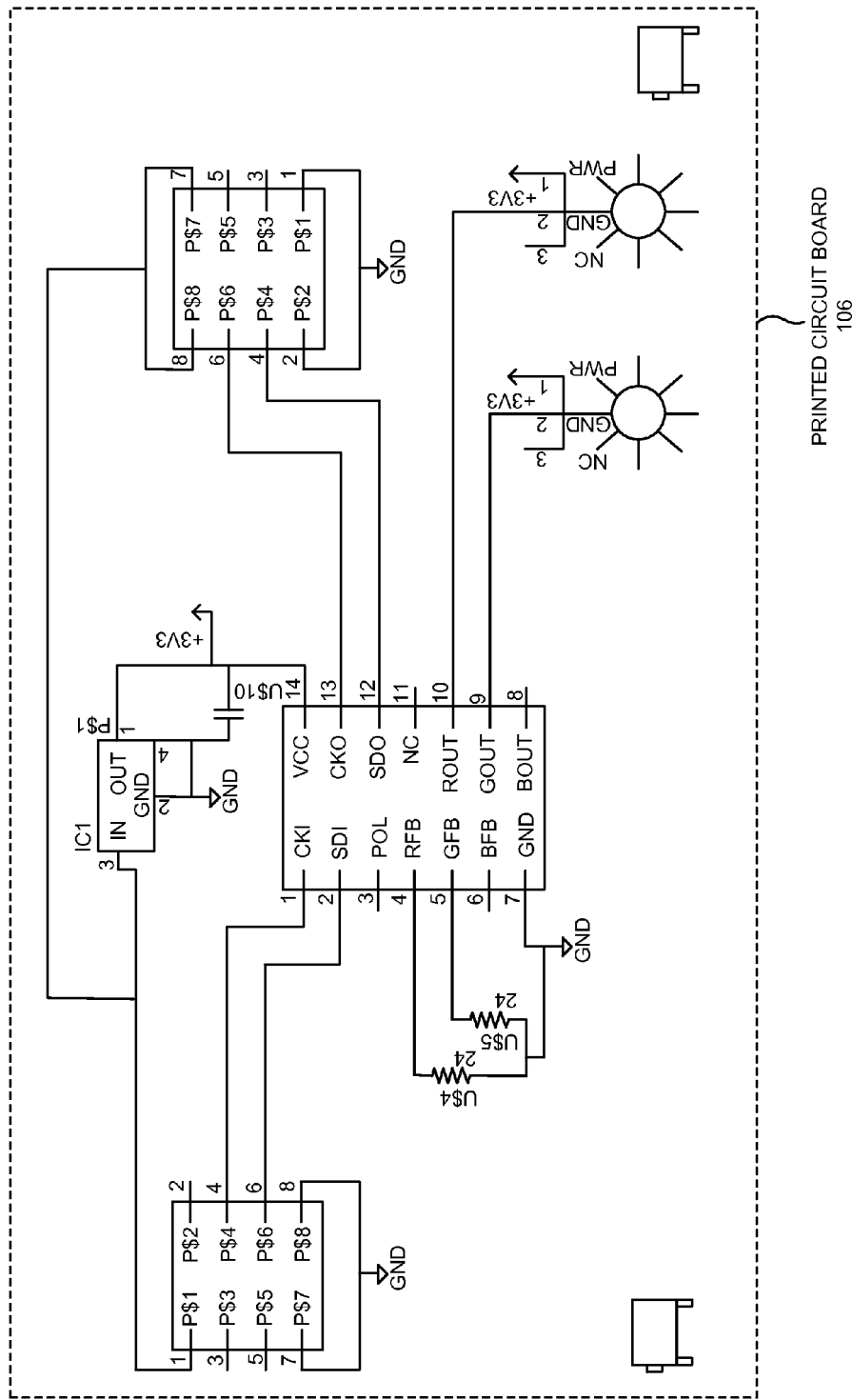
FIG. 6 is a circuit view of the printed circuit board assembly employed in the laser assembly of FIG. 1, according to one embodiment.

FIG. 6 is a circuit view 650 of the printed circuit board 106 employed in the laser assembly 150 of FIG. 1, according to one embodiment.

Particularly, FIG. 6 illustrates a printed circuit board layout in accordance with aspects of the invention. The printed circuit board 106 may be designed such that the components for the circuit design may be located at predetermined positions. According to one embodiment of the invention, the ICs used in the design may be placed in a fixed location on the printed circuit board 106. The printed circuit board 106 may contain many more components in addition to the selected IC component. Accordingly, the areas shown in the figure may be designed to accommodate the different design requirements.

FIG. 7 illustrates laser assemblies in a distribution center 750 showing the attachment of the laser assemblies 150A-N from a floor 708 using a grappling hook 702 by a user 712, according to one embodiment.

Particularly, FIG. 7 builds on FIG. 1, FIG. 2 and further adds a grappling hook 702, a rod 704, a pallet 706, a floor 708, a reflective tape 710, and a user 712 according to one embodiment.

A grappling hook 702 may be a device with iron claws, attached to a rod 704 and used for dragging and/or grasping (e.g., the laser assembly 150 may be attached to the rod 704 of the grappling hook 702), according to one embodiment. A rod 704 may be a thin straight bar, especially of wood and/or metal of the grappling hook 702 which may be attached to the laser assembly 150, according to one embodiment. A pallet 706 may be a flat transport structure that supports goods in a stable fashion. A pallet 706 may be the structural foundation of a unit load which allows handling and/or storage efficiencies, according to one embodiment.

A floor 708 may be a lower surface of the distribution center on which the laser assemblies 150A-N are optimally aligned, according to one embodiment. A reflective tape 710 may be a wide angled durable, high-strength adhesive on the floor 708 used to clearly mark areas or objects, providing a reflective light that is cast off the tape, according to one embodiment. A user 712 may be a person who may attach the laser assembly 150 to a rod 704 of the grappling hook 702, according to one embodiment.

Particularly, FIG. 7 illustrates the multiple laser assemblies 150A-N may be adjusted on the floor prior to placement on the first wire 800A-N and the second wire 802A-N (as illustrated in FIG. 8) by adjustment of the graduation indicator 116 such that a beam of each of the multiple laser assemblies 150A-N may be optimally aligned on the floor 708 (as illustrated in FIG. 7) prior to placement on the multiple laser assemblies 150A-N on the first wire 800A-N and the second wire 802A-N using the grappling hook 702. The beam of each of the multiple laser assemblies 150A-N may be adjustable over 80 degree angle in either a distance from a base angle of the printed circuit board 106.

FIG. 8 is a daisy chain of multiple laser assemblies in distribution center 850, according to one embodiment.

Particularly, FIG. 8 builds on FIG. 1, FIG. 2 and FIG. 7 and further adds a first wire 800A-N, and a second wire 802A-N, according to one embodiment.

A first wire 800A-N may be a primary cable usually cylindrical, flexible strand and/or the rod 704 (as shown in FIG. 7) of metal (e.g., the laser assembly 150 is attached to a first wire 800A-N of a distribution center above a row of the distribution center having a shelving, an inventory, and/or storage compartments along the row), according to one embodiment. A second wire 802A-N may be another cable usually cylindrical, flexible strand and/or the rod 704 (as shown in FIG. 7) of metal (e.g., the laser assembly may be attached to a second wire 802A-N of the distribution center above an area of the distribution center having a walkway, a pallet 706 (as shown in FIG. 7), and/or a stock cart of the distribution center), according to one embodiment.

Particularly, FIG. 8 illustrates that there are multiple ones of the laser, such that the multiple ones of the laser may produce beams in different colors such that different colors indicate a particular worker to pick and put an item at the distribution center. There are multiple ones of the laser, such that the multiple ones of the laser each may produce beams in different flashing patterns such that different patterns may indicate which user 712 (as illustrated in FIG. 7) may pick and place the item at the distribution center. The patterns may be based on a timing pattern, a frequency pattern, an intensity pattern, and a moving light pattern.

The laser assembly 150 also may have a diffused LED to make an active device visible from a distance of 50 meters. The first rotation point 108 and the second rotation point 110 may be fixed using a screw. The laser assembly 150 may be rotatable on a single-axis gimbal and may include twelve lasers to produce a set of two-digit numbers from 1 to 29 using a digit-forming holographic lens (pattern) in front of each of the twelve lasers.

An example embodiment will now be described. Manufacturers may rely upon one-dimensional (1D) bar codes as a means to encode identifying information about the products they make. In turn, industrial and commercial distribution centers (DCs) may utilize laser scanning technology through the embodiments described in FIGS. 1-8 to increase efficiency, accuracy, and/or productivity of pick, pack, and shipping operations performed in distribution center.

In another example embodiment, in the retail industry, warehouses designed to house inventory may now be large and/or more technologically sophisticated distribution centers that work towards maintaining a "just-in-time" inventory. This embodiments of FIGS. 1-8 may improve warehouse automation to meet the needs of E-commerce and Direct-to-Consumer fulfillment using the various embodiments described herein. The embodiments of FIGS. 1-8 may be helpful in providing a complete solution for order execution that can be deployed in minutes, hours, and/or on request. The various embodiments of FIGS. 1-8 may include core operational systems utilized by small, medium sized, and/or growing businesses. The various embodiments of FIGS. 1-8 may be able to provide a very wide area of coverage for automated pick, pack and shipping operations with the convenience of easy of deployment and reconfigurability not found in alternate solutions (e.g., using the various embodiments of FIGS. 1-8 as described herein).

An example embodiment will now be described. The invention various embodiments of FIGS. 1-8 may streamline the fulfillment of E-commerce orders for Consumers as well as mixed SKU pallets for Retail. The durable, quick-connect electronics and cloud-based software utilized with the embodiments of FIGS. 1-8 may work together to enable powerful, real-time order visibility and dramatically improve worker productivity and accuracy (e.g., using the various embodiments of FIGS. 1-8 as described herein). The various embodiments of the solutions described in FIGS. 1-8 of the laser assembly 150 may be easily installed, scalable, and/or affordable for any order fulfillment location in the supply chain (e.g., warehouses, manufacturing plants, cross-docks, and physical retail stores).

The various embodiments of FIGS. 1-8 may bring intelligence to every pick location and every cart or forklift thus increasing accuracy and/or productivity. The various embodiments of FIGS. 1-8 may be revolutionary in its ease of setup, and/or ability to reconfigure layouts providing the flexibility needed for manufacturers. The hardware and/or software of FIGS. 1-8 can be set up in hours and at most days, and with the pennies-per-pick option, there's no upfront cost (e.g., using the various embodiments of FIGS. 1-8 as described herein).

For an example embodiment, the various embodiments of FIGS. 1-8 may be beneficial for the distributor center managers by using the smart electronics which may be helpful to double productivity and accuracy. The distribution center manager may get benefit of using the various embodiments of FIGS. 1-8 which may bring intelligence to each pick location and every cart in the distribution center. Workers in the distribution center can batch pick 5-50 orders with one smart cart so that travel time is minimized and accuracy is high (e.g., using the various embodiments of FIGS. 1-8 as described herein).

Another example embodiment will now be described, in accordance with at least one embodiment. A Tucson Ariz. based distribution center for Macays's Restaurants may be a physical space in which inventory (e.g., frozen foods) are stored for downstream delivery to restaurants in the Macay's Restaurants franchise network. The distribution center may allow a single location to stock a number of frozen foods for distribution to nearby Macay's franchisees.

The Tucson Ariz. distribution server for Macay's may have a series of rows having stacked shelving. In addition, the Macay's distribution center may have a wire (e.g., an overhead steel wire, a location marker line) on which signs are placed that run along the set of rows and/or stacked shelving. The wire may be used to manually hang up signboards (e.g., paper, plastic, chalkboard) to inform workers generally of where frozen items are.

Thanks to the various embodiments of the FIGS. 1-8, the wire may be useful to workers in the distribution center seeking to find inventory to fulfill a particular request when the embodiments of FIGS. 1-8 are deployed with a number of the laser assemblies 150 installed in accordance to the various embodiments described herein. Workers may not need to manually look at a map, discern the labels of each product, and/or search for products on shelves by reading individual labels thanks to the various embodiments of FIGS. 1-8. Utilizing the various embodiments described in FIGS. 1-8 may increase worker productivity through automation. When a new worker Joe is employed, Joe may be quickly productive thanks to the embodiments of FIGS. 1-8. This may reduce cost and increase profitability of Macay's, to the delight of Wall Street and shareholders. Further, such automated processes may be less error prone because they may not depend on human labor thanks to the embodiments of FIGS. 1-8. Rewiring and/or rerouting of the distribution center to accommodate customized solutions may be not be necessary thanks to the modularity and ease of installation of the various embodiments described in FIGS. 1-8.

Various embodiments of the systems and techniques described here can be realized in at least one of a digital electronic circuitry, an integrated circuitry, a specially designed application specific integrated circuits ("ASICs"), a piece of computer hardware, a firmware, a software application, and a combination thereof. These various embodiments can include embodiment in one or more computer programs that are executable and/or interpretable on a programmable system including at least one programmable processor, which may be special or general purpose, coupled to receive data and instructions from, and to transmit data and instructions to, a storage system, an input device, and/or an output device.

These computer programs (also known as programs, software, software applications, and/or code) comprise machine-readable instructions for a programmable processor, and can be implemented in a high-level procedural and/or object-oriented programming language, and/or in assembly/machine language. As used herein, the terms "machine-readable medium" and/or "computer-readable medium" refers to any computer program product, apparatus and/or device (e.g., magnetic discs, optical disks, memory, and/or Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computing device having a display device (e.g., a cathode ray tube ("CRT") and/or liquid crystal ("LCD") monitor) for displaying information to the user and a keyboard and a mouse by which the user can provide input to the computer. Other kinds of devices can be used to provide for interaction with a user as well. For example, feedback provided to the user can be any form of sensory feedback (e.g., visual feedback, auditory feedback, and/or tactile feedback) and input from the user can be received in any form, including acoustic, speech, and/or tactile input.

The systems and techniques described here may be implemented in a computing system that includes a back end component (e.g., as a data server), a middleware component (e.g., an application server), a front end component (e.g., a client computer having a graphical user interface, and/or a Web browser through which a user can interact with an embodiment of the systems and techniques described here), and a combination thereof. The components of the system may also be coupled through a communication network.

The communication network may include a local area network ("LAN") and/or a wide area network ("WAN") (e.g., the Internet). The computing system can include a client and/or a server. In one embodiment, the client and/or the server are remote from each other and interact through the communication network.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, device and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A laser assembly, comprising:
a first support member having a curved upper hook;
a second support member having the curved upper hook;
a printed circuit board in between the first support member and the second support member:
    that is physically coupled with the first support member at a first rotation point of the printed circuit board, and
    which is physically coupled with the second support member at a second rotation point of the printed circuit board, and
wherein the laser assembly is attached to a first wire of a distribution center above at least one row of the distribution center having at least one of a shelving, an inventory, and storage compartments along at least one row.

2. The laser assembly of claim 1
wherein the printed circuit board has at least one laser whose orientation is adjustable when at least one protrusion of the printed circuit board that extends from a curved guide of at least one of the first support member and the second support member is manually adjusted by a user of the laser assembly by shifting at least one protrusion along the curved guide based on a graduation indicator adjacent to the curved guide and on at least one of the first support member and the second support member, and
wherein a laser is mounted straight up on a set of leads and an entire printed circuit board rotates directly when at least one of the first support member and the second support member is manually adjusted by the user of the laser assembly.

3. The laser assembly of claim 2
wherein the laser assembly is attached to a second wire of the distribution center above at least one area of the distribution center having at least one of a walkway, a pallet, and a stock cart of the distribution center.

4. The laser assembly of claim 3:
wherein the laser assembly is attachable to at least one of the first wire and the second wire using a grappling hook from a floor of the distribution center by the user who attaches at least one of the laser assembly to a rod of the grappling hook that extends perpendicularly from an end closest to at least one of the first wire and the second wire above the floor using the grappling hook having attached through the rod of the grappling hook to at least one laser assembly, and
wherein the grappling hook attaches from a side entry of the laser assembly formed by curved hooks of the laser assembly.

5. The laser assembly of claim 4
wherein the laser assembly to produce a test spot usable for at least one of a testing operation and an aiming operation during installation of the laser assembly, and
wherein a holographic lens is used to create a shape that is beamed using the at least one laser to a location on a ground,
wherein a hologram shape is projected on a wide angle reflective tape on the floor.

6. The laser assembly of claim 4:
wherein multiple laser assemblies are attachable with each other in a daisy chain through a shift-register mechanism in which the multiple laser assemblies are communicatively coupled together in a manner such that the curved upper hooks of each laser assembly remains unblocked from communication cables extending below the curved upper hooks from each of the multiple laser assemblies in the daisy chain.

7. The laser assembly of claim 6
wherein a single radio access point is attached to one end of the daisy chain and is able to communicate wirelessly using a server device through a network to receive commands to direct each of the multiple laser assemblies in the daisy chain.

8. The laser assembly of claim 6 wherein each of the multiple laser assemblies in the daisy chain are slidable together along at least one of the first wire and the second wire until affixed by stoppers attached to a wire on opposite ends of the daisy chain.

9. The laser assembly of claim 6
wherein the multiple laser assemblies are adjusted on the floor prior to placement on at least one of the first wire and the second wire by adjustment of the graduation indicator such that a beam of each of the multiple laser assembles is optimally aligned on the floor prior to placement on the multiple laser assemblies on at least one of the first wire and the second wire using the grappling hook.

10. The laser assembly of claim 9 wherein the beam of each of the multiple laser assemblies is adjustable over at least 80 degree angle in either a distance from a base angle of the printed circuit board.

11. The laser assembly of claim 10 wherein there are multiple ones of the at least one laser, such that the multiple ones of the at least one laser produce beams in different colors such that different colors indicate a particular worker to at least one pick and put an item at the distribution center.

12. The laser assembly of claim 11
wherein there are multiple ones of the at least one laser, such that the multiple ones of the at least one laser each produce beams in different flashing patterns such that different patterns indicate which user is to pick and place the item at the distribution center, wherein the patterns are based on a timing pattern, a frequency pattern, an intensity pattern, and a moving light pattern, and
wherein the laser assembly also has a diffused LED to make an active device visible from a distance of at least 50 meters.

13. The laser assembly of claim 1 wherein at least one of the first rotation point and the second rotation point is fixed using a screw.

14. The laser assembly of claim 1 wherein the laser assembly rotatable on a single-axis gimbals, and includes twelve lasers to produce a set of two-digit numbers from 1 to 29 using a digit-forming holographic lens (pattern) in front of each of the twelve lasers.

15. A laser assembly, comprising:
a first support member having a curved upper hook;
a second support member having the curved upper hook;
a printed circuit board in between the first support member and the second support member:
that is physically coupled with the first support member at a first rotation point of the printed circuit board, and
which is physically coupled with the second support member at a second rotation point of the printed circuit board,
wherein the printed circuit board has at least one laser whose orientation is adjustable,
wherein the laser assembly is attached to a first wire of a distribution center above at least one row of the distribution center having at least one of a shelving, an inventory, and storage compartments along at least one row, and
wherein the printed circuit board having at least one laser whose orientation is adjustable when at least one protrusion of the printed circuit board that extends from a curved guide of at least one of the first support member and the second support member is manually adjusted by a user of the laser assembly by shifting the at least one protrusion along the curved guide based on a graduation indicator adjacent to the curved guide and on at least one of the first support member and the second support member.

16. The laser assembly of claim 15
wherein the laser assembly is attached to a second wire of the distribution center above at least one area of the distribution center having at least one of a walkway, a pallet, and a stock cart of the distribution center.

17. The laser assembly of claim 16
wherein the laser assembly is attached to a second wire of the distribution center above at least one area of the distribution center having at least one of a walkway, a pallet, and a stock cart of the distribution center.

18. A laser assembly, comprising:
a first support member having a curved upper hook;
a second support member having the curved upper hook;
a printed circuit board in between the first support member and the second support member:
that is physically coupled with the first support member at a first rotation point of the printed circuit board, and
which is physically coupled with the second support member at a second rotation point of the printed circuit board,
wherein the printed circuit board has at least one laser whose orientation is adjustable, and
wherein the laser assembly is attached to a first wire of a distribution center above at least one row of the distribution center having at least one of a shelving, an inventory, and storage compartments along at least one row, and
wherein the laser assembly is attachable to at least one of the first wire and a second wire using a grappling hook from a floor of the distribution center by a user who attaches at least one of the laser assembly to a rod of the grappling hook that extends perpendicularly from an end closest to at least one of the first wire and the second wire above the floor using the grappling hook having attached through the rod of the grappling hook the at least one laser assembly.

19. The laser assembly of claim 18:
wherein the grappling hook attaches from a side entry of the laser assembly formed by the curved hooks of the laser assembly, and
wherein the printed circuit board having at least one laser whose orientation is adjustable when at least one protrusion of the printed circuit board that extends from a curved guide of at least one of the first support member and the second support member is manually adjusted by the user of the laser assembly by shifting the at least one protrusion along the curved guide based on a graduation indicator adjacent to the curved guide and on at least one of the first support member and the second support member.

20. The laser assembly of claim 19:
wherein the laser assembly is attached to the second wire of the distribution center above at least one area of the distribution center having at least one of a walkway, a pallet, and a stock cart of the distribution center.

\* \* \* \* \*